(12) United States Patent
Reed et al.

(10) Patent No.: US 7,781,678 B2
(45) Date of Patent: Aug. 24, 2010

(54) GROMMET CONFIGURED FOR SUPPORTING SEAL STRIP

(75) Inventors: Camas Reed, Columbus, OH (US); Darin King, Raymond, OH (US); Mark Hegemann, Middletown, OH (US)

(73) Assignee: Honda Motor Company, Ltd., Tokyo (JP)

( * ) Notice: Subject to any disclaimer, the term of this patent is extended or adjusted under 35 U.S.C. 154(b) by 0 days.

(21) Appl. No.: 12/702,799

(22) Filed: Feb. 9, 2010

(65) Prior Publication Data

US 2010/0139972 A1    Jun. 10, 2010

Related U.S. Application Data

(62) Division of application No. 11/731,614, filed on Mar. 30, 2007, now Pat. No. 7,695,041.

(60) Provisional application No. 60/788,504, filed on Mar. 31, 2006.

(51) Int. Cl.
*H02G 3/22* (2006.01)

(52) U.S. Cl. .............................. 174/153 G; 174/152 G; 174/72 A; 174/650; 16/2.1; 16/2.2; 248/56

(58) Field of Classification Search ............ 174/153 G, 174/650, 152 G, 153 R, 152 R, 151, 135, 174/72 A, 668, 669; 16/2.1, 2.2; 248/56, 248/49; 439/587, 274, 275
See application file for complete search history.

(56) References Cited

U.S. PATENT DOCUMENTS

| | | |
|---|---|---|
| 3,999,788 A | 12/1976 | Livingston |
| 4,664,962 A | 5/1987 | DesMarais, Jr. |
| 4,709,124 A | 11/1987 | Wheeler et al. |
| 5,216,203 A | 6/1993 | Gower |
| 5,294,169 A | 3/1994 | Roy et al. |
| 5,394,311 A | 2/1995 | Asano |
| 5,466,036 A | 11/1995 | Stroeters et al. |
| 5,627,342 A | 5/1997 | Kramer |
| 5,732,760 A | 3/1998 | Pattison |
| 5,921,782 A * | 7/1999 | Yamaguchi et al. ........ 174/72 A |
| 6,051,790 A * | 4/2000 | Takeuchi et al. .......... 174/72 A |

(Continued)

OTHER PUBLICATIONS

Notice of Allowance, Examiner Interview Summary, and Examiner's Amendment, mailed on Nov. 17, 2009, U.S. Appl. No. 11/731,614 Titled: Grommet Configured for Supporting Seal Strip, filed: Mar. 30, 2007, Inventor: Camas Reed et al.

*Primary Examiner*—Angel R Estrada
(74) *Attorney, Agent, or Firm*—Ulmer and Berne LLP

(57) ABSTRACT

A grommet is inserted into a notch in a channel and partially supports a seal strip attached to the channel. The grommet includes a main segment and first and second end segments. The main segment extends from a first end to a second end along a longitudinal axis and has a first side surface and a second side surface. The first end segment is attached to the main segment adjacent to the first end of the main segment. The second end segment is attached to the main segment adjacent to the second end of the main segment. The main segment, the first end segment, and the second end segment together define a passageway extending through the grommet parallel to the longitudinal axis. A cable harness including a grommet and a vehicle including a grommet are also provided.

20 Claims, 9 Drawing Sheets

U.S. PATENT DOCUMENTS

| | | |
|---|---|---|
| 6,232,549 B1 | 5/2001 | Burek et al. |
| 6,285,934 B1 | 9/2001 | Shaw |
| 6,323,433 B1 | 11/2001 | Mahaney et al. |
| 6,394,464 B1 | 5/2002 | Moreau |
| 6,465,740 B2 | 10/2002 | Kondoh et al. |
| 6,479,748 B2 * | 11/2002 | Mori ................ 174/153 G |
| 6,553,615 B1 * | 4/2003 | Hansen et al. ......... 174/152 G |
| 6,743,981 B2 | 6/2004 | Miyakoshi |
| 6,768,054 B2 | 7/2004 | Sato et al. |
| 6,787,701 B2 | 9/2004 | Yasuda et al. |
| 6,897,380 B2 | 5/2005 | Sakata et al. |
| 6,995,317 B1 * | 2/2006 | Dzurilla .............. 174/153 G |
| 7,244,894 B1 * | 7/2007 | Lipp .................. 174/153 G |
| 7,390,969 B2 * | 6/2008 | Fraley et al. .......... 174/153 G |
| 7,420,125 B2 * | 9/2008 | Tsukamoto et al. ..... 174/153 G |
| 7,507,912 B1 * | 3/2009 | Sempliner et al. ...... 174/153 G |
| 7,615,713 B2 * | 11/2009 | Bardella et al. ....... 174/153 G |
| 7,723,622 B2 * | 5/2010 | Dukes et al. .......... 174/72 A |
| 2005/0103783 A1 | 5/2005 | Bergum et al. |

* cited by examiner

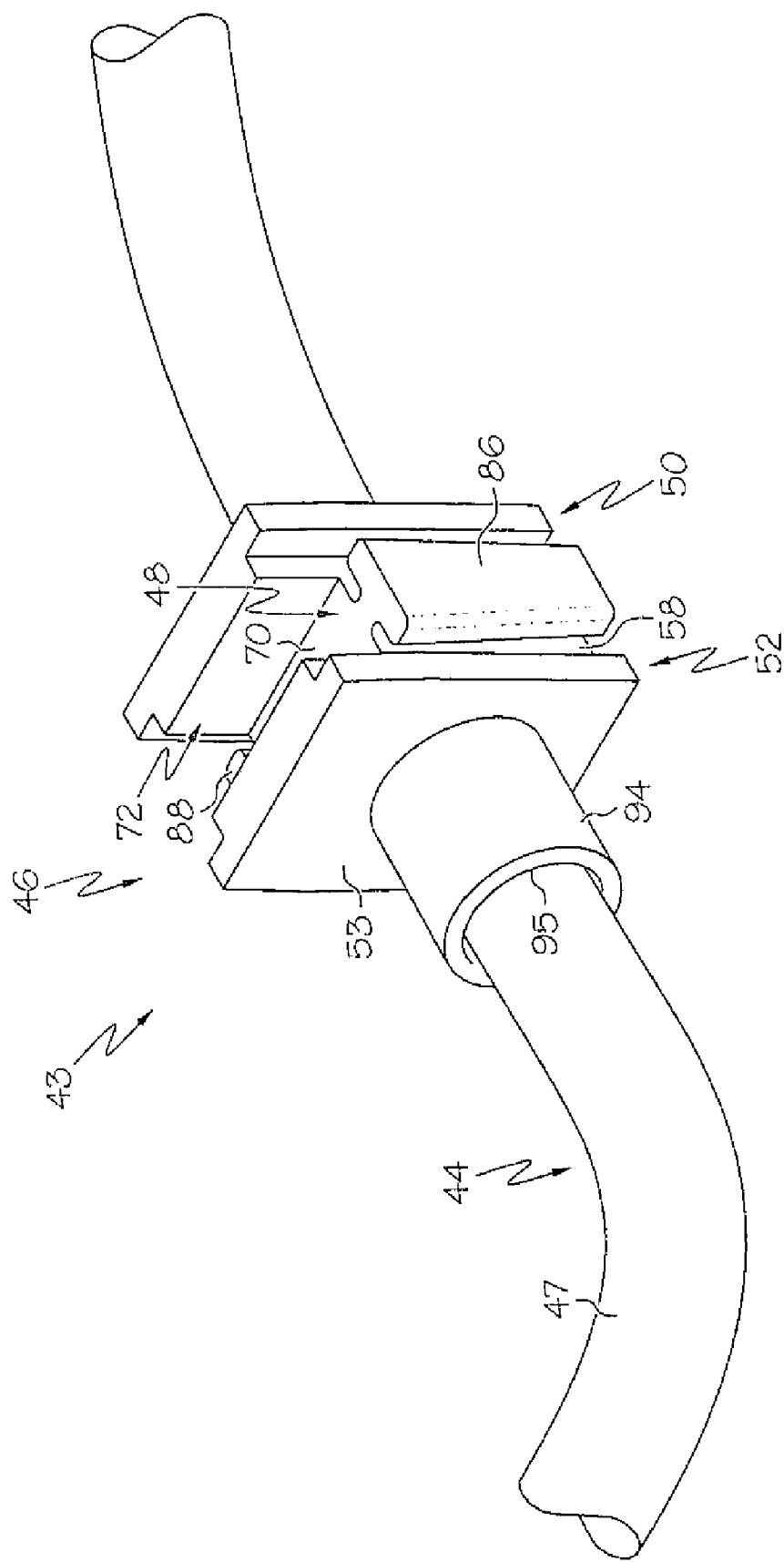

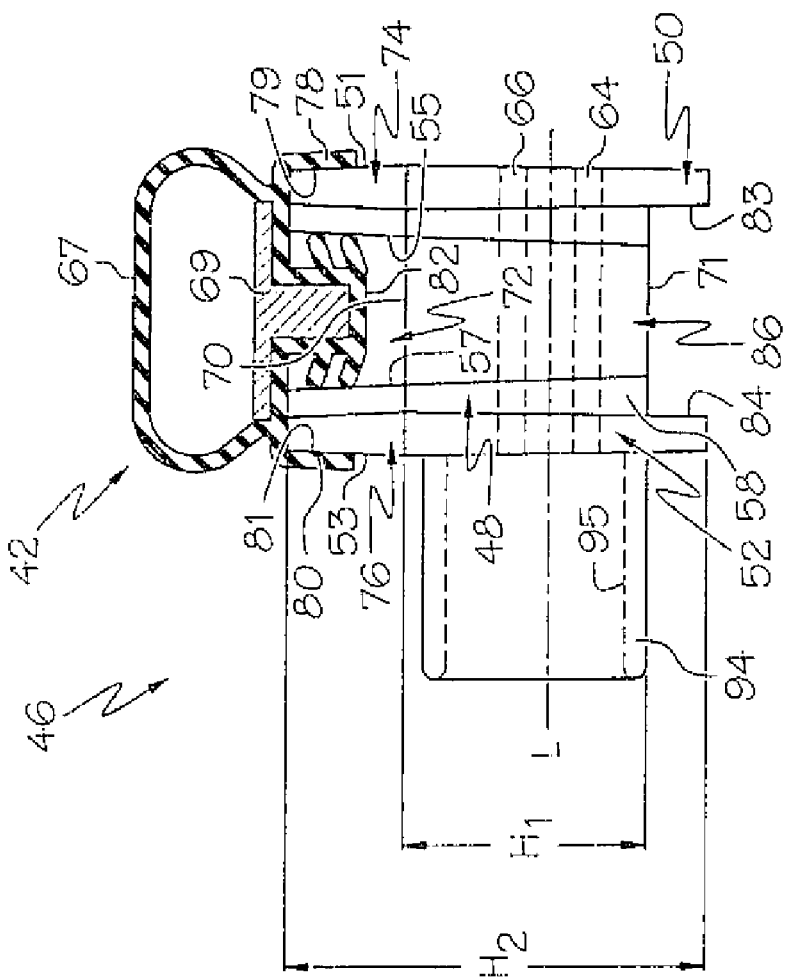
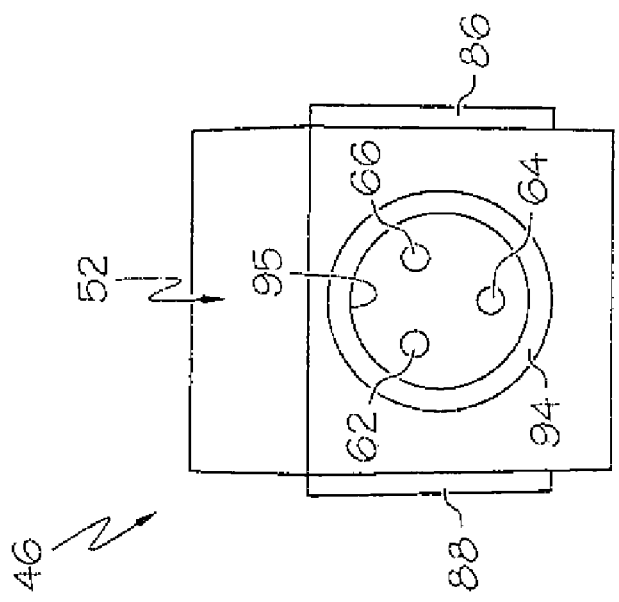
FIG. 10
FIG. 9

US 7,781,678 B2

GROMMET CONFIGURED FOR SUPPORTING SEAL STRIP

CROSS-REFERENCE TO RELATED APPLICATIONS

This application is a divisional of U.S. application Ser. No. 11/731,614, filed Mar. 30, 2007, now U.S. Pat. No. 7,695,041, which claims the benefit of U.S. Provisional Application No. 60/788,504 filed Mar. 31, 2006, and hereby incorporates herein by reference the entire disclosures of both of these prior applications.

TECHNICAL FIELD

The present invention relates to a wire grommet which can be inserted into a notch in a channel to facilitate passage of a cable or other item(s) through the notch and to further provide support for a seal strip attached to the channel.

BACKGROUND OF THE INVENTION

Many vehicles are provided with a compartment having a closure member. A seal strip can be provided to seal the closure member with respect to the remainder of the compartment. It is often desirable to facilitate passage of a cable into such a compartment and past the seal strip. It has conventionally been difficult to do so, however, without jeopardizing the integrity of the seal provided by the seal strip and/or requiring significant amounts of time to ensure that passage of the cable will not interfere with operation of the seal strip.

SUMMARY OF THE INVENTION

In accordance with one embodiment of the present invention, a vehicle has a compartment. The compartment comprises a chamber, a closure member, a channel having a notch, a grommet, and a seal strip. The chamber at least partially defines a cavity for storing articles therein. The chamber has an opening configured to facilitate access to the cavity. The closure member is moveable between a first position in which the closure member at least partially covers the opening to prevent access to the cavity through the opening, and a second position in which the closure member is at least partially spaced away from the opening to allow access to the cavity through the opening. The channel has a notch and is provided upon one of the chamber and the closure member. The grommet is positioned at least partially within the notch and comprises a main segment, a first end segment, and a second end segment. The main segment extends from a first end to a second end along a longitudinal axis and has a first side surface and a second side surface. The first end segment is attached to the main segment adjacent to the first end of the main segment. The second end segment is attached to the main segment adjacent to the second end of the main segment. The main segment, the first end segment, and the second end segment together define a passageway extending through the grommet parallel to the longitudinal axis. The seal strip is attached to the channel and to the grommet. The seal strip is configured to provide a seal between the chamber and the closure member when the closure member is in the first position.

In accordance with another embodiment of the present invention, a grommet is configured for insertion into a notch in a channel and for partially supporting a seal strip attached to the channel. The grommet comprises a main segment, a first end segment, a second end segment, a first retention wing, and a second retention wing. The main segment has a rectangular sectional shape extending from a first end to a second end along a longitudinal axis. The rectangular sectional shape has a height, a first side surface, a second side surface and a top surface. The first end segment has a second height and is attached to the main segment adjacent to the first end of the main segment. The second height is greater than the first height. The second end segment has a height substantially the same as the second height. The second end segment is attached to the main segment adjacent to the second end of the main segment. The first retention wing extends from the first side surface of the main segment such that at least one first groove is provided between the first retention wing and the first side surface. The second retention wing extends from the second side surface of the main segment such that at least one second groove is provided between the second retention wing and the second side surface. The first end segment, the second end segment, and the top surface of the main segment together define a trench therebetween. The main segment, the first end segment, and the second end segment together define a passageway extending through the grommet parallel to the longitudinal axis.

In accordance with yet another embodiment of the present invention, a cable harness assembly comprises a grommet and a cable. The grommet is configured for insertion into a notch in a channel and for partially supporting a seal strip attached to the channel. The grommet comprises a main segment, a first end segment, a second end segment, a first retention wing, and a second retention wing. The main segment has a rectangular sectional shape extending from a first end to a second end along a longitudinal axis. The rectangular sectional shape has a height, a first side surface, a second side surface and a top surface. The first end segment has a second height and is attached to the main segment adjacent to the first end of the main segment. The second height is greater than the first height. The second end segment has a height substantially the same as the second height. The second end segment is attached to the main segment adjacent to the second end of the main segment. The first retention wing extends from the first side surface of the main segment such that at least one first groove is provided between the first retention wing and the first side surface. The second retention wing extends from the second side surface of the main segment such that at least one second groove is provided between the second retention wing and the second side surface. The first end segment, the second end segment, and the top surface of the main segment together define a trench therebetween. The main segment, the first end segment, and the second end segment together define a passageway extending through the grommet parallel to the longitudinal axis in order to facilitate passage of a cable through the grommet. The cable extends through the grommet passageway.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 6 is a perspective view depicting a portion of the cable harness assembly of FIG. 4;

FIG. 9 is a front elevational view of the grommet of FIGS. 7-8;

FIG. 10 is a left-side elevational view of the grommet of FIGS. 7-9 in conjunction with a sectional representation of a seal strip in accordance with one embodiment of the present invention;

DETAILED DESCRIPTION OF EMBODIMENTS

The present invention and its operation is hereinafter described in detail in connection with the views and examples of FIGS. 1-12 wherein like numbers indicate the same or corresponding elements throughout the views. A grommet in accordance with the teachings of the present invention can be used in any of a variety of applications to assist in facilitating passage of a cable or other item(s) through a channel supporting a seal strip. In accordance with one embodiment of the present invention, a grommet can be used in conjunction with a vehicle. Such vehicles can include, for example, automobiles, trucks, vans, motorcycles, recreational vehicles, watercraft, aircraft, agricultural equipment, construction equipment, toys, or other power equipment.

Figure 1:
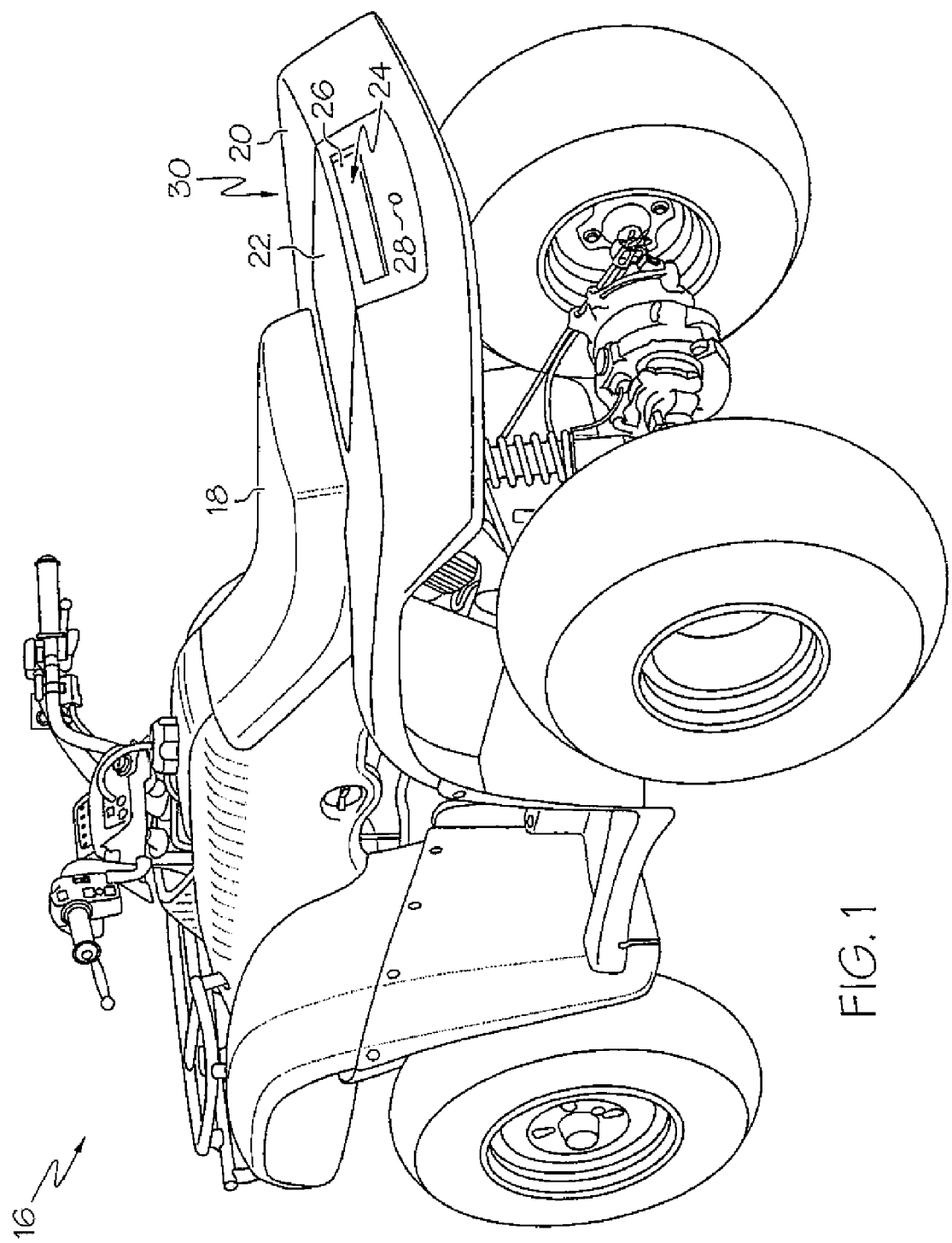
FIG. 1 is a rear perspective view of an all terrain vehicle ("ATV") in accordance with one embodiment of the present invention, wherein a closure member for a compartment is shown to be in a closed position.

In accordance with one embodiment of the present invention, a grommet can be used in conjunction with an ATV. For example, FIG. 1 depicts an ATV 16 having a compartment 30 which is suitable for storage of tools or personal effects. The compartment 30 is shown to be supported by a rear fender 20 of the ATV 16 in a location behind a driver's seat 18, however the location and intended use of a compartment in accordance with the present invention can vary as desired. The compartment 30 includes a closure member 22. A tail light assembly 24 can be attached to the closure member 22 and can include a lens 26 through which light can be emitted. The closure member 22 can also include a latch or lock 28 to facilitate opening or closing of the closure member 22 by an operator of the ATV 16. The closure member 22 is depicted in FIG. 1 as being in a closed, or first, position.

Figure 2:
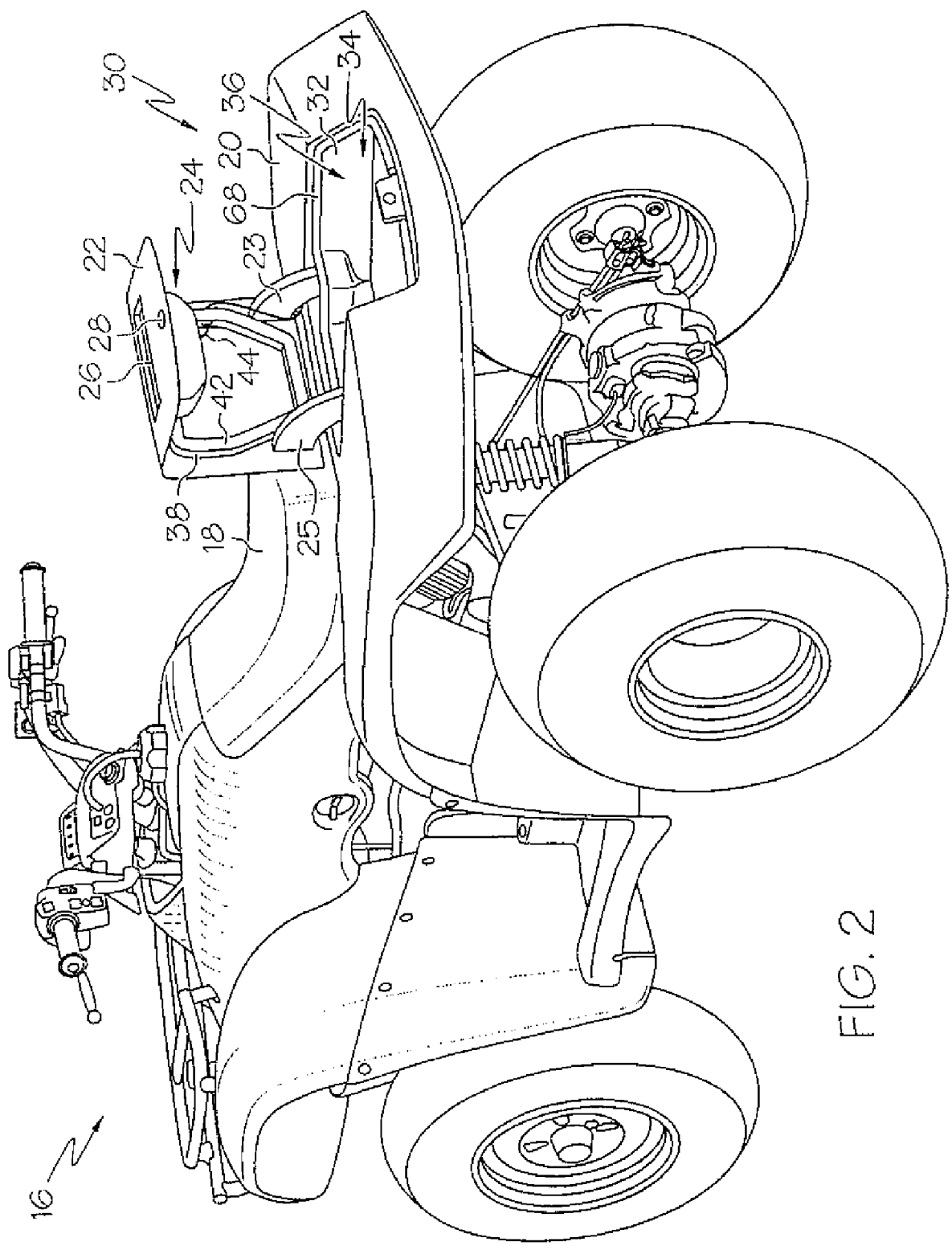
FIG. 2 is a rear perspective view of the ATV of FIG. 1, wherein the closure member is shown to be in an open position.

Turning now to FIG. 2, the closure member 22 is shown in an opened, or second, position. When the closure member 22 is opened, as shown in FIG. 2, access to a cavity 34 can be attained through an opening 36. The cavity 34 can be defined by a chamber 32 which can comprise one or more walls and/or surfaces which provide boundaries for the cavity 34. In accordance with one embodiment of the present invention, the chamber 32 can be provided by one or more plastic, steel or fiberglass walls attached to or otherwise provided by the rear fender 20. The closure member 22 is shown to be supported with respect to the ATV 16 by hinges 23 and 25 such that the closure member 22 is hingedly associated with the chamber 32. However, a closure member may alternatively be attached to a chamber without hinges, and/or might be completely detached from a chamber when the closure member is in the opened position.

The opening 36 to the cavity 34 is shown to be surrounded by a lip 68 which is attached or integral with the chamber 32. A channel 38 is shown to be provided upon the closure member 22 in a location corresponding to the lip 68 such that when the closure member 22 is moved to its closed position (as shown in FIG. 1), the channel 38 aligns with the lip 68 and a seal strip 42 supported upon the channel 38 compresses against the lip 68 to substantially seal the cavity 34 about the periphery of the opening 36 in order to prevent the entry of moisture or debris into the cavity 34. While the channel 38 is shown to be provided upon the closure member 22 with the seal strip 42 supported thereon, it will be appreciated that in other embodiments of the present invention, a channel might be provided upon a stationary portion of a compartment (e.g., the lip 68) for supporting a seal strip such that no portion of a seal strip is attached to the closure member, and the closure member in such circumstance could comprise a lip or other surface for engaging the seal strip accordingly when the closure member is in the closed position.

Figure 3:
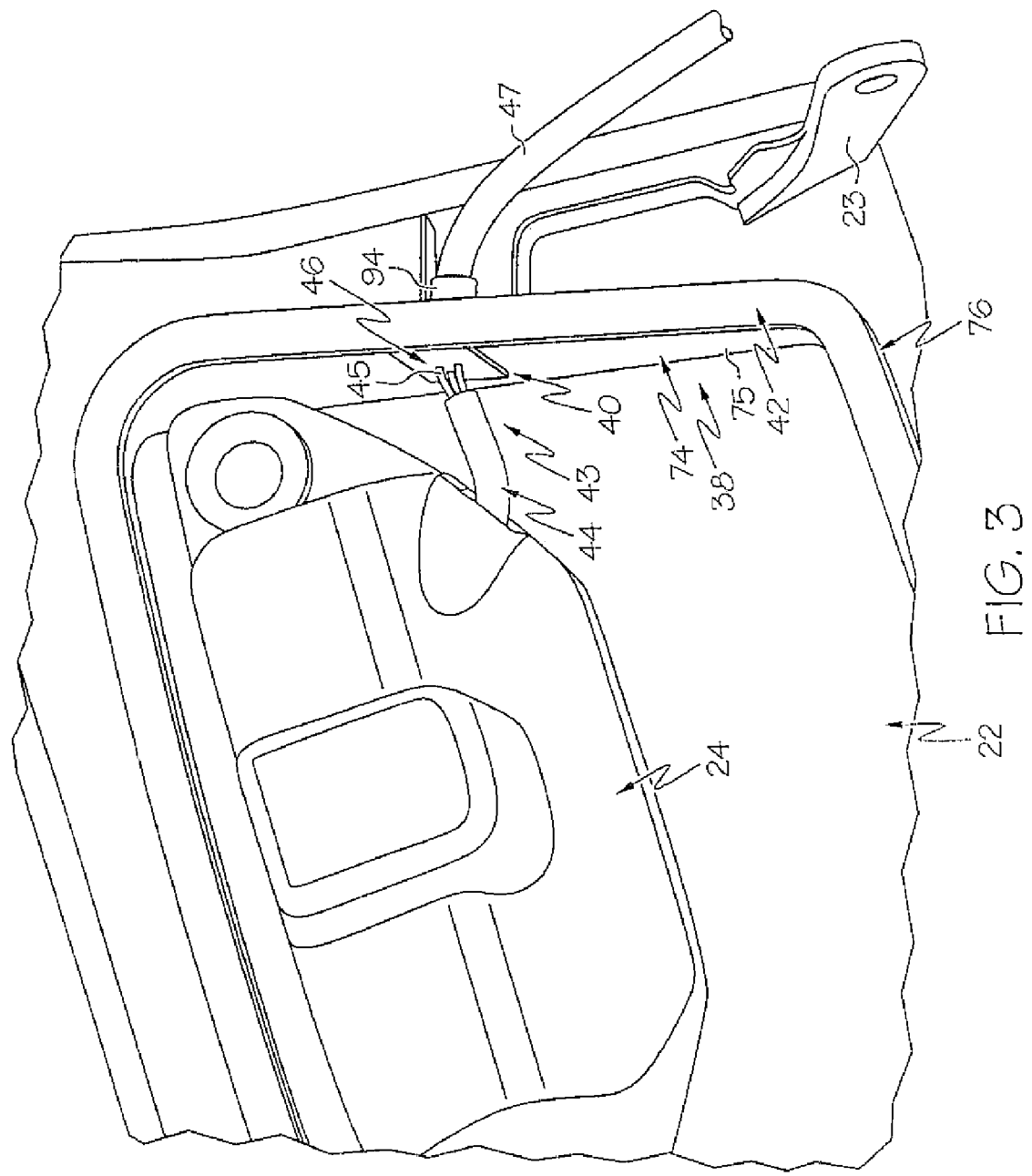
FIG. 3 is a bottom perspective view depicting a portion of the closure member removed from the ATV of FIG. 2.

As shown in FIGS. 2-3, a cable assembly 44 can connect to the tail light assembly 24 for selectively providing power thereto. The cable assembly 44 is shown to pass through the channel 38. This passage can be seen more clearly by referring to FIG. 3. The cable assembly 44 is shown in FIG. 3 to be part of a cable harness assembly 43 which additionally includes a grommet 46. The cable assembly 44 can include one or more wires or cables which are operatively connected to the tail light assembly 24 for providing power to the tail light assembly 24. For example, as shown in FIG. 3, the cable assembly 44 is shown to include three cables 45. In this particular example, one of these three cables can serve as an electrical ground conductor, another of the three cables can serve as an electrical conductor for selectively providing power to a brake light filament within the tail light assembly 24, and the other can serve as an electrical conductor for selectively providing power for a tail light filament within the tail light assembly 24.

Each of these cables 45 is shown to pass through the grommet 46 individually, but when apart from the grommet 46, to be surrounded by a jacket 47. It will of course be appreciated that the individual cables 45 need not be surrounded by the jacket 47, that a cable assembly 44 in accordance with the teachings of the present invention could include fewer or more than three cables, and that the grommet 46 could alternatively be configured to pass all three cables 45 within the jacket 47 through a single passageway. While a cable could pass through a passageway in a grommet, it will be appreciated that any of a variety of other items could alternatively pass through such a passageway including, for example, a fiber optic link, a mechanical link (e.g., a coaxial arrangement with a sliding core wire), and/or a pipe or tube configured for passage of liquid, gas, or solid material.

Figure 4:
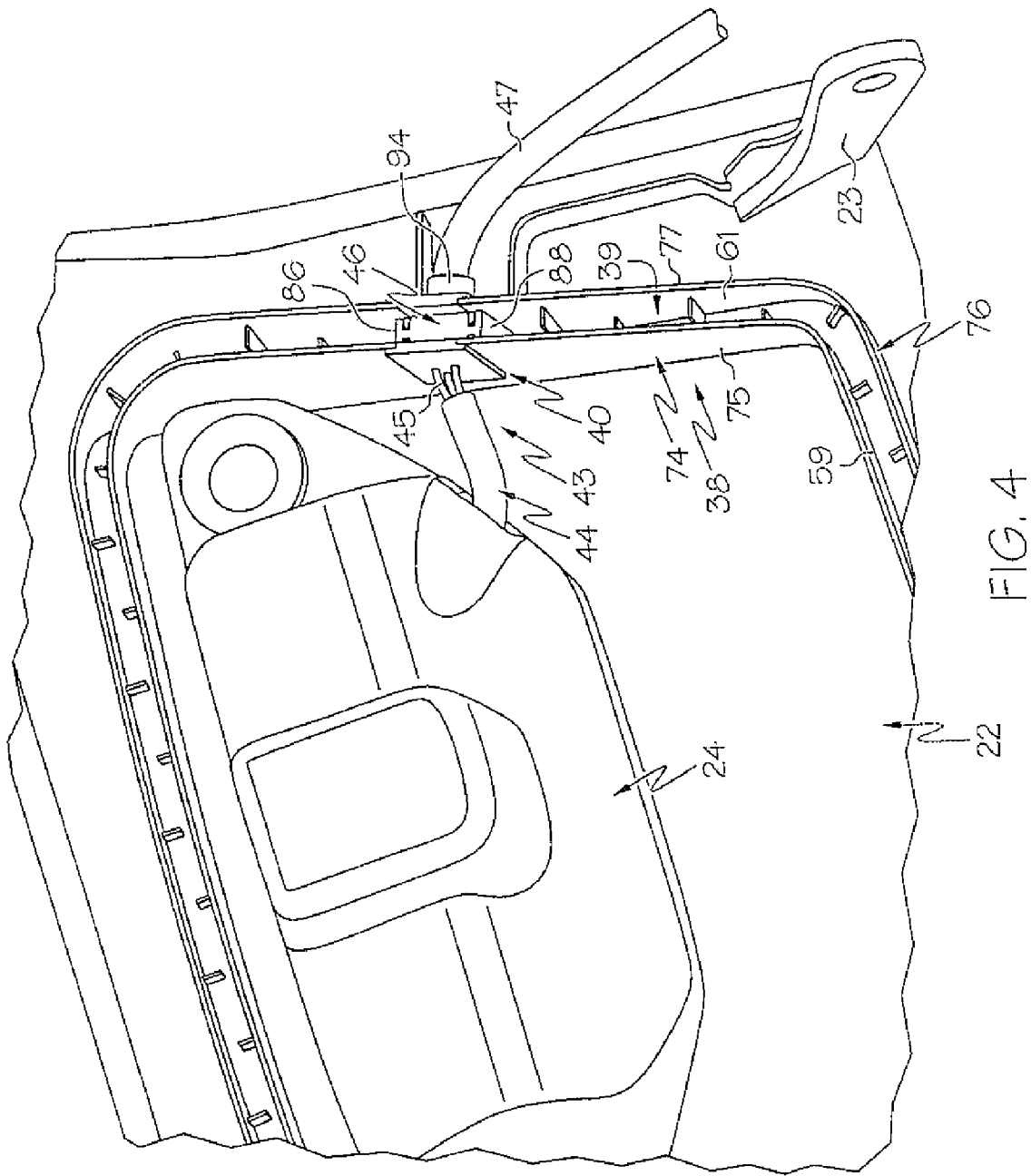
FIG. 4 is a bottom perspective view depicting the closure member of FIG. 3, wherein the seal strip has been removed from the channel for clarity.

FIG. 4 depicts the closure member 22 wherein the seal strip 42 has been removed from the channel 38 for clarity of illustration. The channel 38 is shown to include a first side wall 74 and a second side wall 76. As shown in FIG. 4, the first side wall 74 and the second side wall 76 can be substantially parallel with one another and can define an elongated groove, channel or trench 39 therebetween such as for receiving a portion of the seal strip (e.g., 42 in FIG. 3). The first side wall 74 is shown to include an outer surface 75 and an inner surface 59. Likewise, the second side wall 76 is shown to include an outer surface 77 and an inner surface 61.

Figure 5:
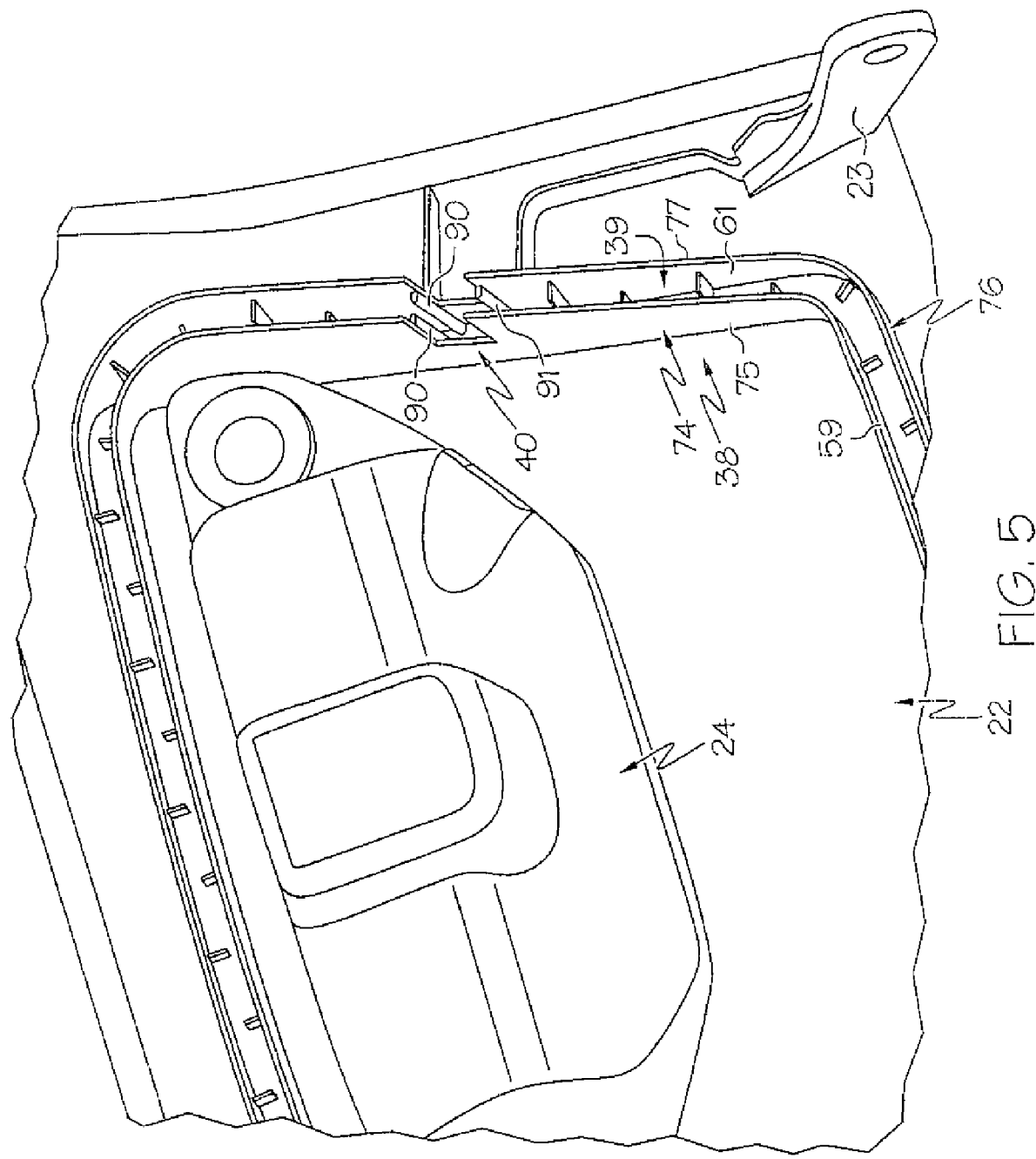
FIG. 5 is a bottom perspective view depicting the closure member of FIG. 4, wherein the cable harness assembly has been removed for clarity.

A notch 40 is shown to be provided in the channel 38, and to include an opening in each of the first side wall 74 and the second side wall 76, as best shown in FIG. 5. First and second tabs 90, 91 are shown to be provided by the channel 38 near the notch 40. It will be appreciated that the grommet 46 can be inserted into the notch 40 in order to facilitate passage of the cable assembly 44 beyond or through the channel 38. When the grommet 46 is inserted into the notch 40, the grommet 46 can be configured to effectively seal or prevent moisture and/or air from passing through the channel 38 at the location of the notch 40.

Figure 7:
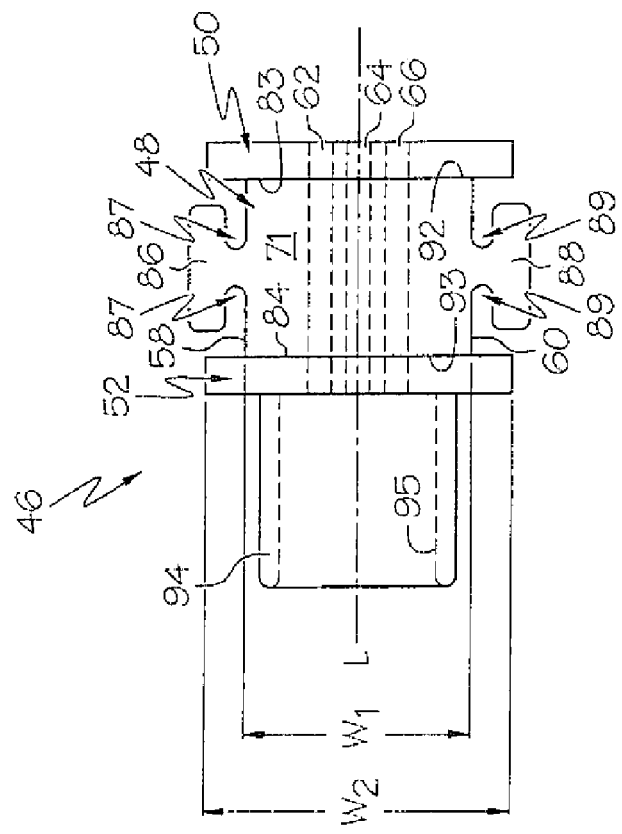
FIG. 7 is a bottom plan view depicting the grommet apart from the remainder of the cable harness assembly of FIG. 6.
Figure 12:
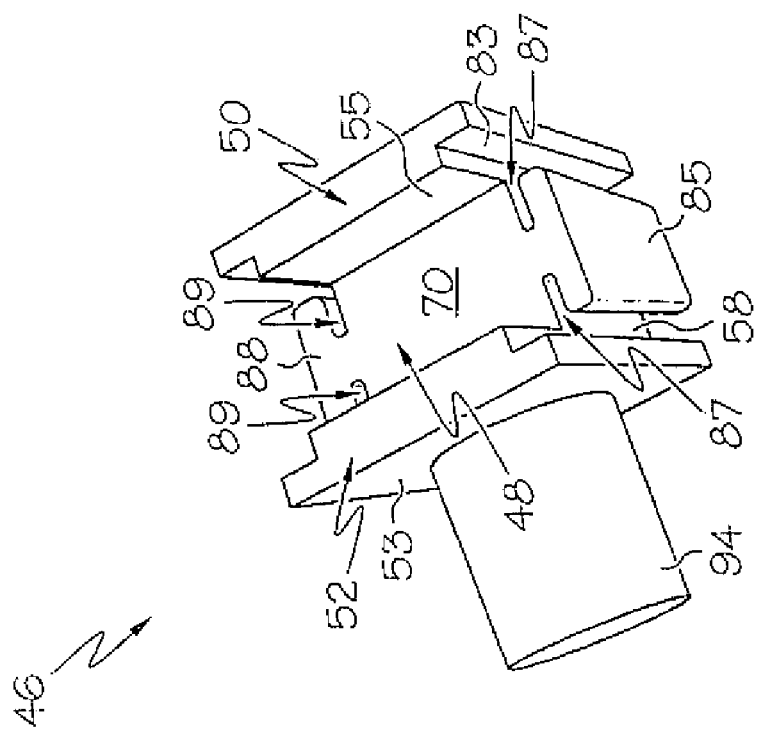
FIG. 12 is a top perspective view of the grommet of FIGS. 7-11.
Figure 11:
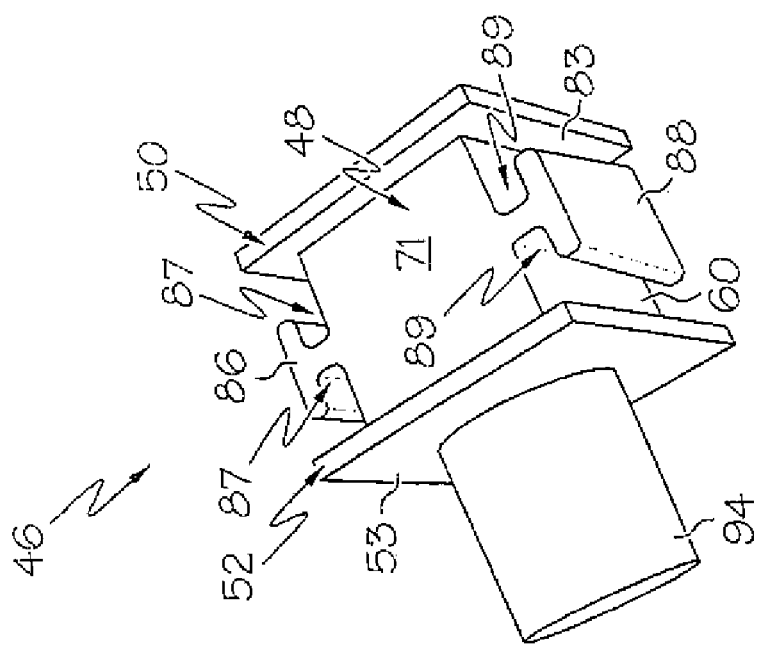
FIG. 11 is a bottom perspective view of the grommet of FIGS. 7-10.

It will be appreciated that a grommet can be provided in any of a variety of specific configurations in accordance with the teachings of the present invention. One particular grommet 46 in accordance with the teachings of the present invention is depicted FIGS. 6-12. The grommet 46 is shown to include a main segment 48, a first end segment 50 and a second end segment 52. The main segment 48 can have a rectangular (e.g., square) sectional shape which extends from a first end 92 to a second end 93 along a longitudinal axis L, as best shown in FIG. 7, and that includes a top surface 70, a bottom surface 71, a first side surface 58 and a second side surface 60. The first end segment 50 can be attached to the main segment 48 adjacent to the first end 92, and the second end segment 52 can be attached to the main segment 48 adjacent to the second end 93.

Referring now to FIG. 10, the first end segment 50 can include an outer surface 51 and an inner surface 55, and the second end segment 52 can include an outer surface 53 and an inner surface 57. The first end segment 50 and the second end segment 52 are shown to extend beyond the top surface 70 of the main segment 48 such that a trench 72 is defined therebetween.

FIG. 10 depicts a sectional view of the seal strip 42 when attached to the grommet 46 (e.g., as shown in FIG. 3). The seal strip 42 is shown to include a resilient portion 67 and a reinforcement portion 69. In one embodiment of the present invention, the resilient portion 67 can be formed from rubber or some other resilient polymeric material, and the reinforcement portion 69 can be formed from metal, such as steel. The seal strip 42 is shown to include a first leg 78 and a second leg 80. The first leg 78 has an inner surface 79 which contacts the outer surface 51 of the first end segment 50 of the grommet 46. The second leg 80 has an inner surface 81 which contacts the outer surface 53 of the second end segment 52 of the grommet 46. When the seal strip 42 and the grommet 46 are associated with the channel 38 as shown in FIG. 3, the inner surface 79 of the first leg 78 also contacts the outer surface 75 of the first side wall 74 of the channel 38, and the inner surface 81 of the second leg 80 also contacts the outer surface 77 of the second side wall 76 of the channel 38.

In certain embodiments of the present invention, it will be appreciated that a seal strip 42 can include a third leg 82, as shown in FIG. 10. The third leg 82 can extend into, and can be retained within, the trench 72. The third leg 82 can contact the inner surface 55 of the first end segment 50 and the inner surface 57 of the second end segment 52 in order to further assist the first leg 78 and the second leg 80 in attaching the seal strip 42 to the grommet 46. In such a configuration, when the seal strip 42 and the grommet 46 are associated with the channel 38 as shown in FIG. 3, the third leg 82 also contacts the inner surface 59 of the first side wall 74 of the channel 38 as well as the inner surface 61 of the second side wall 76 of the channel 38. In this manner, the third leg 82 assists the first leg 78 and the second leg 80 in attaching the seal strip 42 to the channel 38.

As shown in FIG. 10, the first end segment 50 can include another inner surface 83 and the second end segment 52 can include another inner surface 84. The inner surfaces 83 and 84 can be stepped outwardly with respect to the inner surfaces 55 and 57 of the first and second end segments 50, 52, respectively. In this configuration, each of the first end segment 50 and the second end segment 52 have a stepped thickness along the longitudinal axis L. When the grommet 46 is inserted into the notch 40 as shown in FIG. 4, the inner surface 83 of the first end segment 50 can contact the outer surface 75 of the first side wall 74 of the channel 38, and the inner surface 84 of the second end segment 52 can contact the outer surface 77 of the second side wall 76 of the channel 38. Through this contact, it will be appreciated that the first and second end segments 50, 52 can assist in preventing moisture and/or debris from passing through the notch 40 in the channel 38, and can assist in restraining the grommet 46 within the notch 40 in the channel 38. However, in an alternative embodiment of the present invention, the first and second end segments 50 and 52 may not have a stepped configuration, and may accordingly have outer surfaces which are flush with the outer surfaces of the channel when the grommet is inserted into the channel.

Figure 8:
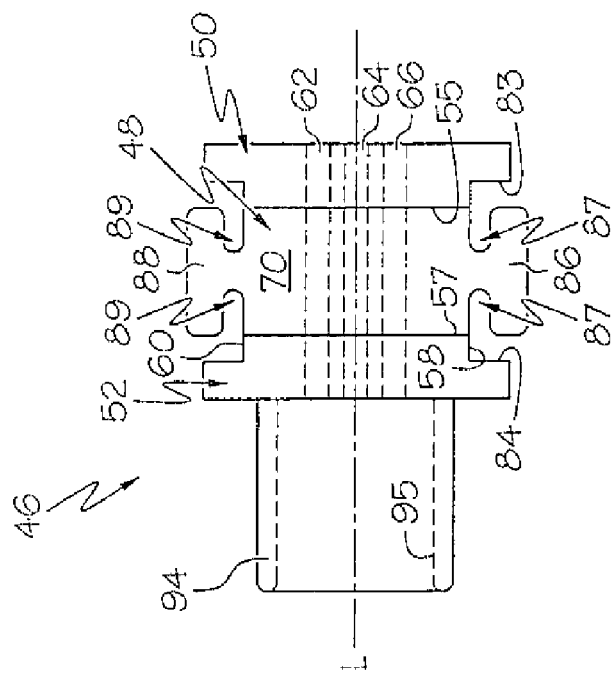
FIG. 8 is a top plan view depicting the grommet of FIG. 7.

Referring again to FIGS. 6-12, the grommet 46 may also include a first retention wing 86 and a second retention wing 88. The first retention wing 86 is shown to have a T-shape and to extend from the first side surface 58 of the main segment 48 such that at least one first groove 87 is provided between the first retention wing 86 and the first side surface 58. The first groove(s) 87 can additionally extend between the first retention wing 86 and one or both of the respective inner surfaces 83, 84 of the first and second end segments 50, 52, as shown in FIG. 8. Likewise, the second retention wing 88 is shown to have a T-shape and to extend from the second side surface 60 of the main segment 48 such that at least one second groove 89 is provided between the second retention wing 88 and the second side surface 60. The second groove(s) 88 can additionally extend between the second retention wing 88 and one or both of the respective inner surfaces 83, 84 of the first and second end segments 50, 52, as shown in FIG. 8.

In the particular embodiment depicted in FIGS. 6-12, the first retention wing 86 of the grommet 46 is shown to provide two first grooves 87, and the second retention wing 88 of the grommet 46 is shown to provide two second grooves 89. The first grooves 87 are configured to engage first tabs 90 provided by the channel 38 near the notch 40, and the second grooves 89 are shown to engage second tabs 91 provided by the channel 38 near the notch 40, as shown in FIGS. 4-5. It will be appreciated, however, that a grommet in accordance with the teachings of the present invention can additionally or alternatively include retention wings provided in any of a variety of alternative configurations, and that the channel can be suitably configured to interface with those retention wings as appropriate.

Referring again to FIG. 10, the rectangular sectional shape of the main segment 48 of the grommet 46 can have a first height $H_1$. Each of the first end segment 50 and the second end segment 52 can have substantially the same height, $H_2$, which can be greater than the first height $H_1$. In this configuration, the first end segment 50 and the second end segment 52 extend beyond the top surface 70 of the main segment 48. Accordingly, the first end segment 50, the second end segment 52, and the top surface 70 of the main segment 48 can together define the trench 72 therebetween. Referring to FIG. 7, the rectangular sectional shape of the main segment 48 can have a first width $W_1$. The first end segment 50 and the second end segment 52 can have substantially the same width $W_2$.

The second width $W_2$ can be greater than the first width $W_1$ such that the grommet 46 can be effectively retained within the notch 40 and can effectively seal the notch 40.

Referring again to FIGS. 6-12, one or more passageways (e.g., 62, 64, 66) can be provided to extend through the grommet 46, such as by passing through the main segment 48, the first end segment 50, and the second end segment 52. In the example depicted in FIGS. 6-12, the grommet 46 can include three distinct passageways 62, 64, 66 which can each accommodate passage of respective cables (e.g., 45, shown in FIG. 3). In an alternate embodiment, however, a grommet in accordance with the teachings of the present invention might only include a single passageway, but that passageway might be sufficiently large to accommodate passage of multiple cables, wherein those cables may or may not be covered with a common jacket (e.g., 47).

A grommet in accordance with the teachings of the present invention might further comprise a collar attached to one or both of the first and second end segments 50, 52. For example, as shown in FIGS. 6-12, the grommet 46 includes a collar 94 which is attached to the outer surface 53 of the second end segment 52. It will be appreciated that a similar collar might additionally or alternatively be provided in association with the first end segment 50. The collar 94 is shown to have an opening 95 of sufficient size to allow insertion therein of the cable assembly 44 (including all three cables 45 and the jacket 47), as shown best in FIG. 6. In an alternate embodiment, a collar can be provided to have one or more openings in any of a variety of alternative configurations. In one of those alternative configurations, the opening(s) can be provided to perfectly align in number, size and position with the passageways (e.g., 62, 64, 66) in the main segment, the first end segment, and the second end segment of the grommet such that the passageway(s) and one or more cables can extend through the collar. The collar 94 can be provided to add stiffness to the cable assembly 44 to prevent the cable assembly 44 from bending such that it interferes with closing of the closure member 22. The collar 94 might additionally assist in sealing the cable assembly 44 with respect to the grommet 46 (e.g., with or without the use of chemical sealants or adhesives) so that moisture and/or debris cannot pass through any passageways (e.g., 62, 64, 66) in the grommet 46.

A grommet in accordance with the teachings of the present invention can comprise any of a variety of materials including, for example, rubber or some other resilient polymeric material. It will also be appreciated that the main segment 48, the first end segment 50, the second end segment 52, and the collar 94 can be formed integrally during a common molding process. However, in an alternative embodiment, one or more of these components can be formed separately for subsequent assembly together.

Through use of a cable harness assembly and notched channel as described above, it will be appreciated that the manufacturing process for a vehicle can be improved significantly as compared to conventional configurations. In particular, when assembling the closure member 22, the cable harness assembly 43 can be installed simply by attaching one end of the cable harness 43 to the tail light assembly 24 and then inserting the grommet 46 into the notch 40, as shown in FIG. 4. The seal strip 42 can then be attached to the channel 38 and to the grommet 46. In this manner, cables (e.g., 45) can pass through the channel 38 without interfering with the attachment of the seal strip 42 to the channel 38, without significantly disrupting the seal provided by the seal strip, and without requiring any complicated installation or wire-routing procedures.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A grommet for insertion into a notch in a channel and for partially supporting a seal strip attached to the channel, the grommet comprising:

a main segment having a rectangular sectional shape extending from a first end to a second end along a longitudinal axis, the rectangular sectional shape having a first height, a first side surface, a second side surface and a top surface;

a first end segment having a second height and attached to the main segment adjacent to the first end of the main segment, the second height being greater than the first height;

a second end segment having a height substantially the same as the second height, the second end segment attached to the main segment adjacent to the second end of the main segment;

a first retention wing extending from the first side surface of the main segment such that at least one first groove is provided between the first retention wing and the first side surface; and a second retention wing extending from the second side surface of the main segment such that at least one second groove is provided between the second retention wing and the second side surface;

wherein the first end segment, the second end segment, and the top surface of the main segment together define a trench therebetween, and the main segment, the first end segment, and the second end segment together define a passageway extending through the grommet parallel to the longitudinal axis.

2. The grommet of claim 1 wherein each of the first retention wing and the second retention wing is T-shaped.

3. The grommet of claim 1 wherein each of the first end segment and the second end segment has a stepped thickness along the longitudinal axis.

4. The grommet of claim 1 wherein the rectangular sectional shape of the main segment has a first width, the first end segment has a second width greater than the first width, and the second end segment has a width substantially the same as the second width.

5. The grommet of claim 1 further comprising a collar attached to one of the first end segment and the second end segment, wherein the passageway extends through the collar.

6. A cable harness assembly comprising:

a grommet configured for insertion into a notch in a channel and for partially supporting a seal strip attached to the channel, the grommet comprising:

a main segment having a rectangular sectional shape extending from a first end to a second end along a longitudinal axis, the rectangular sectional shape having a first height, a first side surface, a second side surface and a top surface;

a first end segment having a second height and attached to the main segment adjacent to the first end of the main segment, the second height being greater than the first height;

a second end segment having a height substantially the same as the second height, the second end segment attached to the main segment adjacent to the second end of the main segment;

a first retention wing extending from the first side surface of the main segment such that at least one first groove is provided between the first retention wing and the first side surface;

a second retention wing extending from the second side surface of the main segment such that at least one second groove is provided between the second retention wing and the second side surface;

wherein the first end segment, the second end segment, and the top surface of the main segment together define a trench therebetween, and the main segment, the first end segment, and the second end segment together define a passageway extending through the grommet parallel to the longitudinal axis in order to facilitate passage of a cable through the grommet; and a cable extending through the passageway of the grommet.

7. The cable harness of claim 6 wherein each of the first retention wing and the second retention wing is T-shaped.

8. The cable harness of claim 6 wherein each of the first end segment and the second end segment has a stepped thickness along the longitudinal axis.

9. The cable harness of claim 6 wherein the rectangular sectional shape of the main segment has a first width, the first end segment has a second width greater than the first width, and the second end segment has a width substantially the same as the second width.

10. The cable harness of claim 6 wherein the grommet further comprises a collar attached to one of the first end segment and the second end segment, and further wherein the passageway and the cable extends through the collar.

11. A grommet for insertion into a notch in a channel and for partially supporting a seal strip attached to the channel, the grommet comprising:

a main segment having a rectangular sectional shape extending from a first end to a second end along a longitudinal axis, the rectangular sectional shape having a first height, a first side surface, a second side surface and a top surface;

a first end segment having a second height and attached to the main segment adjacent to the first end of the main segment, the second height being greater than the first height;

a second end segment having a height substantially the same as the second height, the second end segment attached to the main segment adjacent to the second end of the main segment;

a first retention wing extending from the first side surface of the main segment such that at least one first groove is provided between the first retention wing and the first side surface; and a second retention wing extending from the second side surface of the main segment such that at least one second groove is provided between the second retention wing and the second side surface; wherein:

the first end segment, the second end segment, and the top surface of the main segment together define a trench therebetween, and the main segment, the first end segment, and the second end segment together define a passageway extending through the grommet parallel to the longitudinal axis;

each of the first retention wing and the second retention wing is T-shaped; and the rectangular sectional shape of the main segment has a first width, the first end segment has a second width greater than the first width, and the second end segment has a width substantially the same as the second width.

12. The grommet of claim 11 wherein each of the first end segment and the second end segment has a stepped thickness along the longitudinal axis.

13. The grommet of claim 12 further comprising a collar attached to one of the first end segment and the second end segment, wherein the passageway extends through the collar.

14. A cable harness assembly comprising the grommet of claim 13 and further comprising a cable, wherein the cable extends through both the passageway and the collar.

15. A cable harness assembly comprising the grommet of claim 12 and further comprising a cable, wherein the cable extends through the passageway in the grommet.

16. The grommet of claim 12 being formed as a unitary structure from a resilient polymeric material.

17. The grommet of claim 11 further comprising a collar attached to one of the first end segment and the second end segment, wherein the passageway extends through the collar.

18. A cable harness assembly comprising the grommet of claim 17 and further comprising a cable, wherein the cable extends through both the passageway and the collar.

19. A cable harness assembly comprising the grommet of claim 11 and further comprising a cable, wherein the cable extends through the passageway in the grommet.

20. The grommet of claim 11 being formed as a unitary structure from a resilient polymeric material.

* * * * *

UNITED STATES PATENT AND TRADEMARK OFFICE
CERTIFICATE OF CORRECTION

| | | |
|---|---|---|
| PATENT NO. | : 7,781,678 B2 | Page 1 of 1 |
| APPLICATION NO. | : 12/702799 | |
| DATED | : August 24, 2010 | |
| INVENTOR(S) | : Camas Reed et al. | |

It is certified that error appears in the above-identified patent and that said Letters Patent is hereby corrected as shown below:

Column 3, line 45, change "scat 18" to --seat 18--.

Column 5, line 3, change "wail 76" to --wall 76--.

Signed and Sealed this
Twenty-fifth Day of January, 2011

David J. Kappos
*Director of the United States Patent and Trademark Office*